United States Patent
Ma et al.

(10) Patent No.: US 11,794,737 B2
(45) Date of Patent: Oct. 24, 2023

(54) VEHICLE OPERATION

(71) Applicant: Ford Global Technologies, LLC, Dearborn, MI (US)

(72) Inventors: Chenhao Ma, Canton, MI (US); Tony Tae-Jin Pak, Garden City, MI (US); Ahmed Benmimoun, Aachen (DE); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 17/224,211

(22) Filed: Apr. 7, 2021

(65) Prior Publication Data

US 2022/0324442 A1    Oct. 13, 2022

(51) Int. Cl.
| | |
|---|---|
| *B60W 30/12* | (2020.01) |
| *B60W 30/14* | (2006.01) |
| *G05D 1/02* | (2020.01) |
| *G08G 1/01* | (2006.01) |
| *G08G 1/16* | (2006.01) |

(52) U.S. Cl.
CPC ............ *B60W 30/12* (2013.01); *G08G 1/167* (2013.01); *B60W 2554/801* (2020.02); *B60W 2554/806* (2020.02); *B60W 2720/10* (2013.01)

(58) Field of Classification Search
CPC .......... B60W 30/12; B60W 2554/801; B60W 2554/806; B60W 2720/10; B60W 30/143; B60W 2552/53; B60W 2554/4041; G05D 2201/0213; G05D 1/0214; G05D 1/0274; G08G 1/167; G08G 1/0112; G08G 1/0133; G08G 1/166; G08G 1/0129

USPC .......................................................... 701/36
See application file for complete search history.

(56) References Cited

U.S. PATENT DOCUMENTS

| | | | |
|---|---|---|---|
| 9,809,219 B2 | 11/2017 | Agnew et al. | |
| 10,055,653 B2 | 8/2018 | Cohen et al. | |
| 10,569,771 B2 | 2/2020 | Song et al. | |
| 2017/0010612 A1* | 1/2017 | Asakura | G08G 1/096783 |
| 2017/0269602 A1* | 9/2017 | Nakamura | G05D 1/0214 |
| 2018/0201257 A1* | 7/2018 | Dudar | B60W 30/08 |
| 2019/0146516 A1 | 5/2019 | Eshima | |
| 2020/0019179 A1* | 1/2020 | Schuller | B60W 30/12 |
| 2020/0207346 A1* | 7/2020 | Tsuji | B60W 30/12 |
| 2020/0385020 A1* | 12/2020 | Komuro | B60W 60/0017 |
| 2020/0393847 A1* | 12/2020 | Govindan | G08G 1/096725 |
| 2021/0001888 A1* | 1/2021 | Oguro | B60W 60/0027 |
| 2021/0086768 A1* | 3/2021 | Komoguchi | G08G 1/16 |
| 2021/0286365 A1* | 9/2021 | Jiao | B60W 60/0011 |

(Continued)

FOREIGN PATENT DOCUMENTS

CN    112037567 A    12/2020

*Primary Examiner* — Abby Y Lin
*Assistant Examiner* — Hossam M El Abd Latif
(74) *Attorney, Agent, or Firm* — Frank A. MacKenzie; Bejin Bieneman PLC

(57) ABSTRACT

While operating a vehicle on a travel path, a width of the travel path is determined based on a map. Upon detecting a presence or an absence of a target vehicle in the travel path, a lateral position for the vehicle on the travel path is determined based on the width of the travel path and the presence or absence of the target vehicle. The vehicle is controlled to operate according to the determined lateral position on the travel path and a speed of the vehicle that is based on the determined lateral position on the travel path.

20 Claims, 7 Drawing Sheets

(56) References Cited

U.S. PATENT DOCUMENTS

2021/0380136 A1\* 12/2021 Choi ................. B60W 60/0015
2023/0021615 A1\* 1/2023 Inaba ..................... G08G 1/167

\* cited by examiner

VEHICLE OPERATION

BACKGROUND

A vehicle can be equipped with electronic and electro-mechanical components, e.g., computing devices, networks, sensors, controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
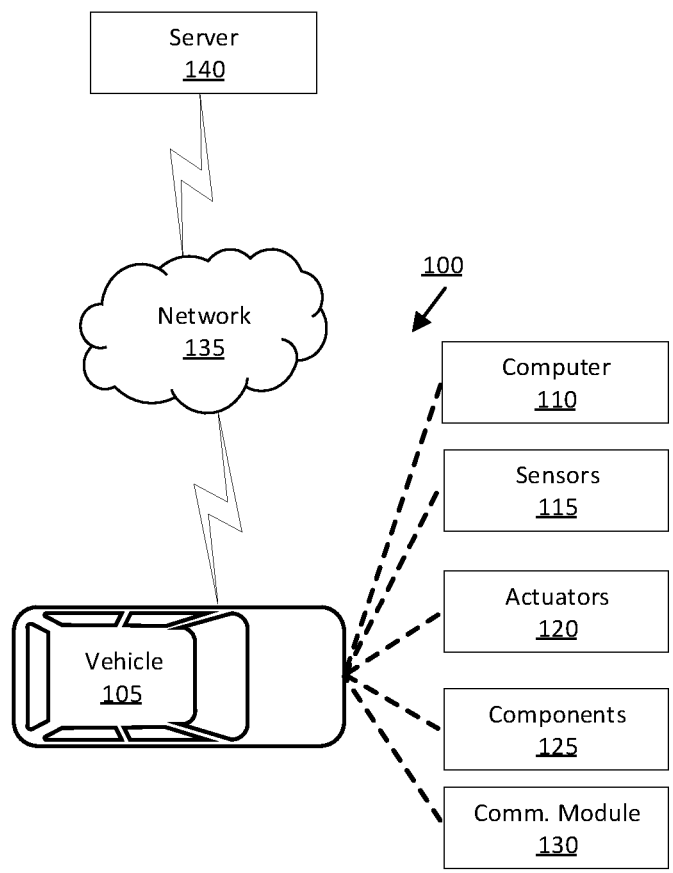
FIG. 1 is a block diagram illustrating an example vehicle control system.

A vehicle computer can operate a vehicle on a travel path, i.e., a specified area for vehicle travel, in an operating area that can include a plurality of sub-areas, i.e., a specified area for vehicle stowage, e.g., parking spaces. While operating on the travel path, the vehicle computer can search for available sub-areas, e.g., unoccupied parking spaces, via image data. The vehicle computer can determine the travel path based on map data. While operating on the travel path, fields of view of available vehicle sensors may define blind zones along boundaries of the travel path within which the vehicle sensors cannot acquire data. An object may be in the blind zone and thus undetectable by the available sensors. In this situation, one or more objects, e.g., pedestrians and other vehicles, may move out of the blind zone and enter the travel path. Typically, the vehicle computer may operate the vehicle at a lateral position (as discussed below) within the travel path to avoid impeding other vehicles operating on the travel path in an opposite direction than the vehicle regardless of whether any such vehicles are present on the travel path, which may increase a size of the blind zones along the boundaries of the travel path. Additionally, the vehicle computer may reduce a speed of the vehicle along the travel path such that the vehicle computer has additional time to control the vehicle upon detecting an object entering the travel path from a blind zone, which can impede other vehicles operating on the travel path in a same direction as the vehicle.

Advantageously, the vehicle computer can determine a lateral position, i.e., proximity to a boundary of the travel path, for the vehicle within the travel path based on detecting a presence or absence of other vehicles operating on the travel path. A "lateral position" is a distance defined by a line extending from the vehicle to a boundary of the travel path and perpendicular to a longitudinal axis of the vehicle and/or the boundary of the travel path. The vehicle computer can determine a lateral position that minimizes blind zones along the boundaries of the travel path while not impeding other vehicles, if any, operating on the travel path in an opposite direction than the vehicle. Additionally, the vehicle computer can then determine a speed for the vehicle based on the lateral position of the vehicle within the travel path. By determining a speed for the vehicle based on the lateral position, the vehicle computer can determine a speed at which to operate the vehicle that reduces a likelihood of impacting objects that enter the travel path from a blind zone, which can also reduce a likelihood of impeding other vehicles, if any, operating on the travel path in a same direction as the vehicle.

A system includes a computer including a processor and a memory, the memory storing instructions executable by the processor to, while operating a vehicle on a travel path, determine a width of the travel path based on a map. The instructions further include instructions to, upon detecting a presence or an absence of a target vehicle in the travel path, determine a lateral position for the vehicle on the travel path based on the width of the travel path and the presence or absence of the target vehicle. The instructions further include instructions to control the vehicle to operate according to the determined lateral position on the travel path and a speed of the vehicle that is based on the determined lateral position on the travel path.

The instructions can further include instructions to determine the lateral position for the vehicle on the travel path additionally based on detecting lane markings on the travel path.

The instructions can further include instructions to, upon detecting the absence of the target vehicle, determine the lateral position to be closer to the lane markings on the travel path than to a boundary of the travel path.

The instructions can further include instructions to, upon detecting the absence of the target vehicle, determine the lateral position to be centered on the travel path.

The instructions can further include instructions to, upon detecting a presence of the target vehicle, determine the lateral position to be centered between the target vehicle and a boundary of the travel path.

The instructions can further include instructions to, upon detecting a presence of the target vehicle, determine the lateral position to be closer to the target vehicle than to a boundary of the travel path.

The instructions can further include instructions to, upon determining a risk level for the travel path from the map, determine the speed for the vehicle on the travel path additionally based on the risk level of the travel path.

The system can include a remote computer including a second processor and a second memory. The second memory can store instructions executable by the second processor to generate the map based on aggregated data including messages from a plurality of vehicles indicating the risk level of the travel path.

The instructions can further include instructions to determine a risk level for the travel path based on a type of object detected alongside the travel path. The instructions can further include instructions to determine the speed for the vehicle within the travel path additionally based on the risk level of the travel path.

The instructions can further include instructions to the risk level for the travel path additionally based on detecting a blind zone alongside the travel path.

The instructions can further include instructions to, upon detecting a presence of the target vehicle, stop the vehicle based on the determined speed being less than a speed threshold.

The instructions can further include instructions to, upon detecting an object entering the travel path, stop the vehicle based on the object being within a distance threshold of the vehicle.

The instructions can further include instructions to generate the map based on sensor data obtained while operating the vehicle in a training mode.

The instructions can further include instructions to provide the map to a remote computer.

The target vehicle may be traveling in an opposite direction than the vehicle.

A method includes, while operating a vehicle on a travel path, determining a width of the travel path based on a map. The method further includes, upon detecting a presence or an absence of a target vehicle in the travel path, determining a lateral position for the vehicle on the travel path based on the width of the travel path and the presence or absence of the target vehicle. The method further includes controlling the vehicle to operate according to the determined lateral position on the travel path and a speed of the vehicle that is based on the determined lateral position on the travel path.

The method can further include, upon detecting the absence of the target vehicle, determining the lateral position to be centered on the travel path.

The method can further include, upon detecting the absence of the target vehicle, determining the lateral position to be closer to a lane marking on the travel path than to a boundary of the travel path.

The method can further include, upon detecting a presence of the target vehicle, determining the lateral position to be centered between the target vehicle and a boundary of the travel path.

The method can further include, upon detecting a presence of the target vehicle, determining the lateral position to be closer to the target vehicle than to a boundary of the travel path.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-3E, an example vehicle control system 100 includes a vehicle 105. A vehicle computer 110 in the vehicle 105 receives data from sensors 115. The vehicle computer 110 is programmed to, while operating the vehicle 105 on a travel path 205 (see FIG. 2), determine a width W of the travel path 205 based on a map. A travel path 205 is a specified area within an operating area 200 (as discussed below), e.g., a lane or an aisle, for vehicle 105 travel. The vehicle computer 110 is further programmed to, upon detecting a presence or an absence of a target vehicle 215 in the travel path 205, determine a lateral position L for the vehicle 105 on the travel path 205 based on the width W of the travel path 205 and the presence or absence of the target vehicle 215. The vehicle computer 110 is further programmed to control the vehicle 105 to operate according to the determined lateral position L on the travel path 205 and a speed of the vehicle 105 that is based on the determined lateral position L on the travel path 205.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings 305, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., CV2X, DSRC, cellular, or the like.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
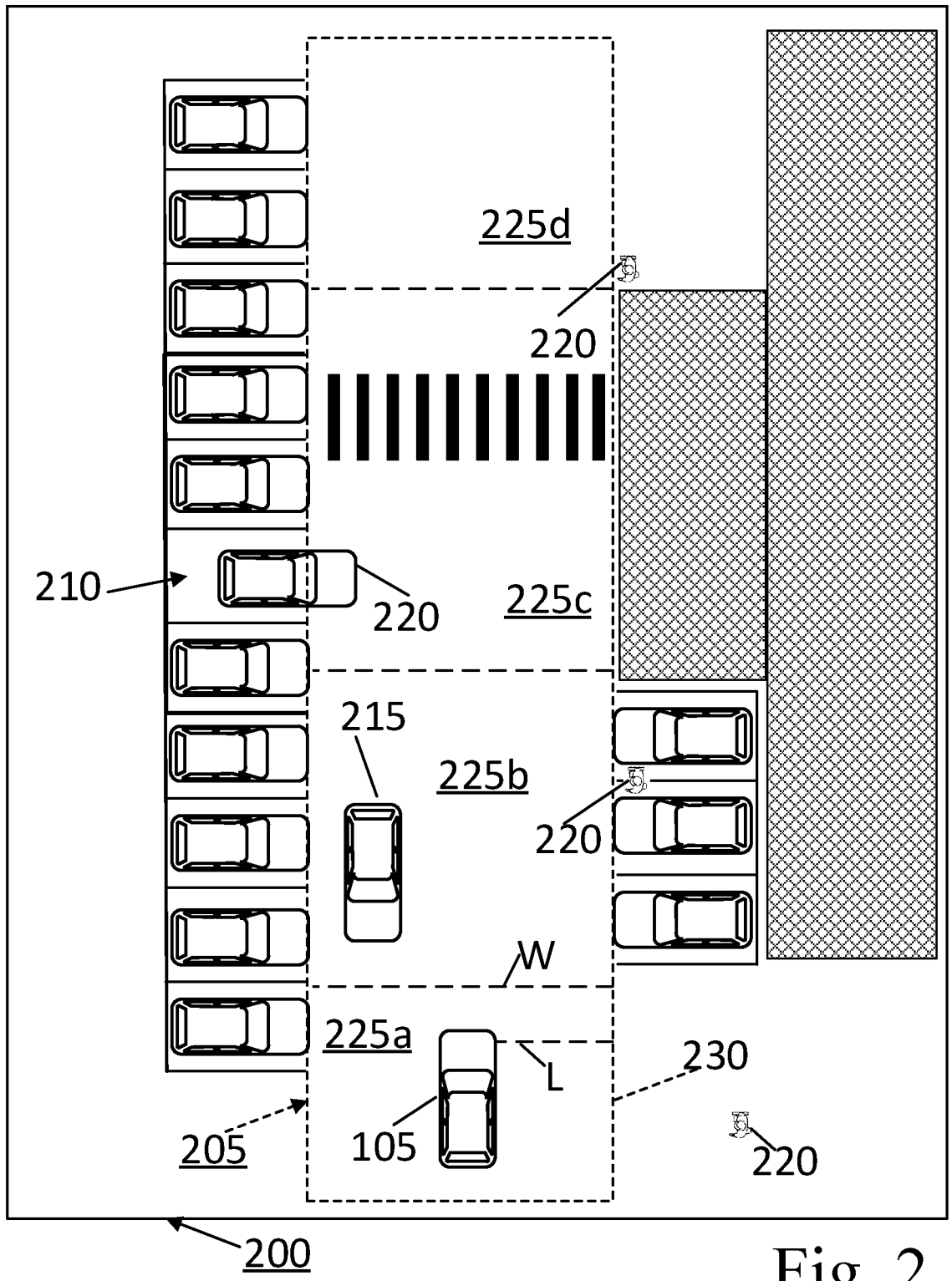
FIG. 2 is a diagram illustrating a vehicle operating in an exemplary area.

FIG. 2 is a diagram illustrating a vehicle 105 operating in an example operating area 200 that includes marked sub-areas 210 (e.g., parking spaces) for vehicles 105. The vehicle computer 110 may be programmed to determine whether the vehicle 105 is in an operating area 200. A operating area 200 is a specified area of ground surface for operating and/or stowing a vehicle 105. The operating area 200 may be on a street or road, e.g., an area 200 alongside a curb or an edge of the street, a parking lot or structure or portion thereof, etc.

A sub-area 210 may, for example, be a parking space indicated by conventional markings, e.g., painted lines on a ground surface, and conventional image recognition techniques can be employed by the vehicle computer 110 to identify the sub-area 210.

The vehicle computer 110 may be programmed to determine that the vehicle 105 is within the operating area 200 based on sensor 115 data. For example, the vehicle computer 110 may be programmed to determine that the vehicle 105 is within the operating area 200 by any suitable technique for determining a location of the vehicle 105, e.g., GPS-based geo-fencing. A geo-fence herein has the conventional meaning of a boundary for an area defined by sets of geo-coordinates. In such an example, the geo-fence specifies a perimeter of the operating area 200. The vehicle computer 110 can then determine that the vehicle 105 is within the operating area 200 based on the location data of the vehicle 105 indicating the vehicle 105 is within the geo-fence. As another example, the vehicle computer 110 may determine whether the vehicle 105 is in the operating area 200 based on data, e.g., map data, received from the remote server computer 140. For example, the vehicle computer 110 may receive a location of the vehicle 105, e.g., from a sensor 115, a navigation system, a remote server computer 140, etc. The vehicle computer 110 can compare the location of the vehicle 105 to the map data, e.g., to determine whether the vehicle 105 is in the operating area 200 specified in the map data.

Upon determining that the vehicle 105 has moved into the operating area 200, the vehicle computer 110 can access a map of the operating area 200 from a memory of the vehicle computer 110. The map can, for example, specify one or more travel paths 205 within the operating area 200, including one or more segments 225 for the travel path(s) 205 along with corresponding risk levels and widths W for the segment(s) 225. A travel path 205 may be unidirectional, i.e., provided for vehicle 105 travel in one direction along the travel path 205, or bidirectional, i.e., provided for vehicle 105 travel in opposing directions along the travel path 205. The travel path 205 may, for example, accommodate only one vehicle 105, i.e., such that multiple vehicles 105 can travel in the travel path 205 one in front of the other, but not abreast of, i.e., laterally adjacent, one another. Alternatively, the travel path 205 may accommodate multiple vehicles 105, i.e., such that multiple vehicles 105 can travel in the travel path 205 abreast of one another.

As used herein, a "risk level" is a measure that the vehicle computer 110 can use to determine a speed for the vehicle 105 along a segment 225, and that indicates a likelihood of the vehicle 105 impacting an object 220 while operating along the segment 225. The risk level may be specified as a text string, e.g., "high", "medium", or "low". As another example, the risk level may be specified as a number, e.g., an integer on a scale from 1 to 3, inclusive. In this example, a risk level of 3 represents a higher likelihood that the vehicle 105 will impact an object 220 along the segment 225 than a risk level of 2 or 1, and a risk level of 1 represents a lower likelihood that the vehicle 105 will impact an object 220 along the segment 225 than a risk level of 2.

The vehicle computer 110 can, for example, receive the map of the operating area 200, e.g., from the remote server computer 140, and store the received map in the memory of the vehicle computer 110. In such an example, the remote server computer 140 can generate and update the map based on aggregated data (as discussed below). As another example, the vehicle computer 110 can generate the map of the operating area 200. The vehicle computer 110 can store the map, e.g., in a memory of the vehicle computer 110. Additionally, or alternatively, in such an example, the vehicle computer 110 can provide the map to the remote server computer 140.

In an example in which the vehicle computer 110 generates the map, the vehicle computer 110 may be programmed to transition a training mode between a disabled state and an enabled state based on the location of the vehicle 105. For example, upon determining that the vehicle 105 has moved into a operating area 200, the vehicle computer 110 can enable the training mode, i.e., transition the training mode from the disabled state to the enabled state. As another example, upon determining that the vehicle 105 has moved out of the operating area 200, the vehicle computer 110 can disable the training mode, i.e., transition the training mode from the enabled state to the disabled state. That is, the training mode is enabled when the vehicle 105 is in a operating area 200 and is disabled when the vehicle 105 is not in an operating area 200.

In the training mode, a user can operate the vehicle 105 on a travel path 205 in an operating area 200, and the vehicle computer 110 is programmed to actuate one or more sensors 115 to record an environment including and around the travel path 205. The vehicle computer 110 can then generate the map based on the sensor 115 data of the environment around the vehicle 105. For example, the vehicle computer 110 can identify one or more segments 225 along the travel path 205 along with corresponding risk levels and widths for the segment(s) 225 based on sensor 115 data, as discussed below.

In the training mode, the vehicle computer 110 can receive sensor 115 data, e.g., image data, of the environment around the vehicle 105. The image data can include one or more objects 220 around the vehicle 105. For example, the vehicle computer 110 can be programmed to classify and/or identify object(s) 220 based on sensor 115 data. For example, object 220 classification techniques can be used, e.g., in the vehicle computer 110 based on lidar sensor 115 data, camera sensor 115 data, etc., to classify a detected object 220 as mobile or stationary, i.e., non-movable. Additionally, or alternatively, object 220 identification techniques can be used, e.g., in the vehicle computer 110 based on lidar sensor 115 data, camera sensor 115 data, etc., to identify a type of object 220, e.g., a vehicle, a pedestrian, a building, etc., as well as physical features of objects 220. Non-limiting examples of objects 220 include a pedestrian, another vehicle 105, a bicycle, a shopping cart, a building, etc.

Various techniques such as are known may be used to interpret sensor 115 data and/or to classify objects 220 based on sensor 115 data. For example, camera and/or lidar image data can be provided to a classifier that comprises programming to utilize one or more conventional image classification techniques. For example, the classifier can use a machine learning technique in which data known to represent various objects 220, is provided to a machine learning program for training the classifier. Once trained, the classifier can accept as input vehicle 105 sensor 115 data, e.g., an image, and then provide as output, for each of one or more respective regions of interest in the image, an identification and/or a classification (i.e., mobile or stationary) of one or more objects 220 or an indication that no object 220 is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of objects 220 identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 can identify segments 225 included in the travel path 205 based on a type of object 220 (or lack thereof), e.g., parked vehicles, walls, buildings, foliage, poles, fencing, rails, etc., detected alongside the travel path 205. A segment 225 is an area of the travel path 205 that extends across the width W of the travel path 205 and along a portion, i.e., some but less than all, of a length of the travel path 205. For example, the travel path 205 may include a plurality of segments 225225A, 225B, 225C, 225D, as shown in FIG. 2. In this example, the segments 225A, 225B, 225C, 225D are identified based on a type of object 220 (or lack thereof) alongside the segment 225 being different than the type of object 220 (or lack thereof) alongside a previous segment 225.

To identify a segment 225, the vehicle computer 110 can, for example, receive location data for the vehicle 105 upon detecting a new type of object 220 (or lack thereof) alongside the travel path 205. The vehicle computer 110 can determine and store, e.g., in a memory of the vehicle computer 110, geo-coordinates specified by the location data of the vehicle 105 after identifying the new type of object 220 (or lack thereof) alongside the travel path 205. The vehicle computer 110 can identify the plurality of segments 225 based on successive vehicle 105 locations. That is, each segment 225 may extend from one vehicle 105 location to a successive vehicle 105 location. Each segment 225 can include an identifier, e.g., a numerical value, an alphanumeric string, etc., identifying the respective segment 225. The vehicle computer 110 can generate and assign an identifier to a corresponding segment 225. For example, the vehicle computer 110 can maintain a counter. Upon detecting a segment 225, i.e., upon detecting a new type of object 220 (or lack thereof) alongside the travel path 205, the vehicle computer 110 can increment the counter and assign a counter value to the segment 225.

The vehicle computer 110 can determine a risk level for a segment 225 based on the type of object 220 (or lack thereof) detected alongside the travel path 205 between the geo-coordinates specifying the segment 225. For example, the vehicle computer 110 may maintain a look-up table, or the like, that associates various types of objects 220 (or a lack thereof) with corresponding risk levels. The vehicle computer 110 can, for example, access the look-up table and determine the risk level for a segment 225 based on a stored type of object 220 (or lack thereof) matching a detected type of object 220 (or lack thereof) alongside the travel path 205. The look-up table may be stored, e.g., in a memory of the vehicle computer 110. An example look-up table is shown in Table 1 below:

TABLE 1

| Object Type | Risk Level |
|---|---|
| None | 2 |
| Parked Vehicle | 3 |
| Building | 1 |

Additionally, or alternatively, the vehicle computer 110 can determine the risk level for the segment 225 based on detecting a blind zone (as discussed below) alongside the segment 225 between the geo-coordinates specifying the segment 225. For example, the look-up table may associate blind zones, e.g., a presence or absence of a blind zone and/or a size, of a blind zone, with corresponding risk levels. The vehicle computer 110 can, for example, access the look-up table and determine the risk level for a segment 225 based on a stored blind zone matching a detected blind zone.

The vehicle computer 110 can define a blind zone for a segment 225 based on sensor 115 data, e.g., fields of view of the sensors 115. For example, sensors 115 may be mounted to a rear, front, and/or a side of the vehicle 105 exterior. Respective fields of view of each of one or more sensors 115 may partially overlap. In the present context, a blind zone of a sensor 115 is an area or, more typically, a three-dimensional space, i.e., a volume, outside a field of view of the sensor 115, i.e., an area or volume from which a sensor 115 cannot obtain data. A blind zone for a vehicle 105 can exist when sensors 115 of the vehicle 105 collectively cannot provide data to detect objects 220 and environmental features within an area or volume. A shape or boundaries of a blind zone is typically defined by features and objects 220 in an environment that occupy, surround, and/or abut the blind zone. When the vehicle 105 is in a segment 225, an object 220, e.g., a parked vehicle, a building, etc., may define a portion of the blind zone. The fields of view of the sensors 115 may be determined empirically, e.g., based on fields of view required to perform one or more vehicle 105 functions. The vehicle computer 110 may store the fields of view of each of the sensors 115, e.g., in a memory.

The vehicle computer 110 can identify a width W of a segment 225, i.e., a distance between boundaries 230 (see FIGS. 3A-3E) of the segment 225. The vehicle computer 110 can determine boundaries 230 of the segment 225 based on sensor 115 data. The boundary 230 of the segment 225 may be partly defined by objects 220, e.g., parked vehicles, a curb, a building, etc., and/or conventional markings, i.e., painted lines on the ground, e.g., sub-area 210 markings. For example, the vehicle computer 110 can detect objects 220 and/or markings laterally spaced from the vehicle 105 on the segment 225, e.g., using image recognition techniques.

To determine the width W of the segment 225, the vehicle computer 110 can, for example, employ free space computation techniques to image data that identifies a range of pixel coordinates associated with a boundary 230 spaced laterally from the vehicle 105 and free space (i.e., space in which no object 220 is detected) between the vehicle 105 and the boundary 230. By identifying a set of pixel coordinates in an image associated with the free space and the boundary 230 and determining a distance (in pixel coordinates) from an image sensor 115 lens, e.g., across the free space, to the identified boundary 230 pixel coordinates, the vehicle computer 110 can then determine a distance, e.g., across the free space, of the image sensor 115 lens from the boundary 230. That is, according to such known techniques, the vehicle computer 110 can determine a distance from the lens to the identified coordinates (in pixel coordinates) and can further determine, from the image an angle between a line from the sensor 115 lens to a point on the identified boundary 230, and an axis extending from the lens parallel to the longitudinal axis of the vehicle 105. Then, using trigonometric functions based on (i) a line extending from the sensor 115 lens to the point on the boundary 230, (ii) a line extending from the sensor 115 lens along the axis, and (iii) a line that intersects the point on the boundary 230 and with which the line extending along the axis forms a right angle, the vehicle computer 110 can determine a length of the line drawn parallel to a vehicle 105 lateral axis from (a) an axis extending from the sensor 115 lens parallel to a lateral axis of the vehicle 105 to (b) the point on the boundary 230. By repeating this process for the boundary 230 on the other side of the vehicle 105 and summing the lengths of two lines parallel to the vehicle 105 lateral axis and drawn from the axis extending from the respective sensor 115 lens parallel to the lateral axis of the vehicle 105 to the respective points on the boundary 230, a width W of the travel path 205 may be determined.

Upon accessing the map, the vehicle computer 110 can operate the vehicle 105 through the operating area 200 based on receiving a request, e.g., from a remote server computer 140, a user device (e.g., a smartphone, a tablet, a personal digital assistant, a smart watch, a laptop, etc.), a human-machine interface in the vehicle 105, etc. Specifically, the vehicle computer 110 can operate the vehicle 105 to travel through the operating area 200 via travel paths 205 and/or to depart or enter sub-areas 210 based on the map. For example, the vehicle computer 110 can actuate one or more vehicle components 125 to move the vehicle 105 along one or more travel paths 205 in the operating area 200, e.g., to search for available sub-areas 210, to rendezvous with a user for pick up at a specified location, etc.

The vehicle computer 110 is programmed to determine a lateral position L for the vehicle 105 on the travel path 205 based on detecting a presence or absence of a target vehicle 215. A target vehicle 215 is another vehicle traveling on the travel path 205 in front of the vehicle 105. The target vehicle 215 may, for example, be traveling in an opposite direction than the vehicle 105. Alternatively, the target vehicle 215 may be traveling in a same direction as the vehicle 105. A lateral position L is a position of the vehicle 105 relative to a boundary 230 of the travel path 205 and is specified by a distance along the lateral axis of the vehicle 105 from the vehicle 105 to the boundary 230 of the travel path 205. In the examples shown in the Figures, the lateral distance D is position of the vehicle 105 relative to a boundary 230 on a right, i.e., passenger, side of the vehicle 105.

Figure 3A:
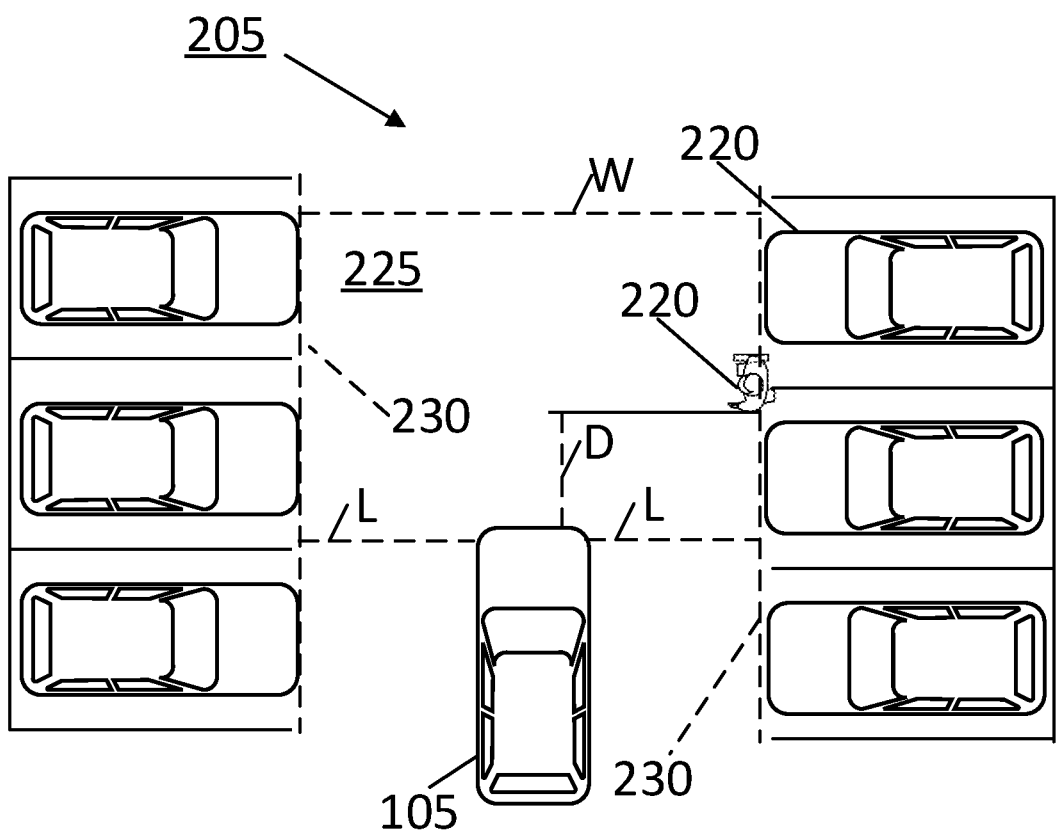
FIG. 3A-3E are diagrams illustrating example lateral positions for the vehicle within a segment of a travel path.

While operating the vehicle 105 through the operating area 200, the vehicle computer 110 can receive sensor 115 data, e.g., image data, of the travel path 205. The vehicle computer 110 can detect the presence or absence of the target vehicle 215 based on the sensor 115 data. For example, the vehicle computer 110 can identify the target vehicle 215 on the travel path 205 based on output from the classifier, as discussed above. Upon detecting the absence of the target vehicle 215, the vehicle computer 110 can determine the lateral position L that maximizes a distance between each side of the vehicle 105 and the boundary 230 on the corresponding side of the vehicle 105. For example, the vehicle computer 110 can determine the lateral position L of the vehicle 105 to be centered on the travel path 205, i.e., equidistant from the boundaries of the travel path 205, as shown in FIG. 3A. That is, the vehicle computer 110 can determine the lateral position L such that the longitudinal axis of the vehicle 105 bisects the width W of the travel path 205 while the vehicle 105 operates on the travel path 205.

Upon detecting the presence of the target vehicle 215, the vehicle computer 110 can determine the lateral position L of the vehicle 105 based on the travel direction of the target vehicle 215. The travel direction can be one of towards, i.e., approaching, the vehicle 105, or away from the vehicle 105. For example, when the travel direction of the target vehicle 215 is away from, i.e., in a same direction as, the vehicle 105, the vehicle computer 110 can determine the lateral position L for the vehicle 105 to correspond to the lateral position L of the target vehicle 215. As one example, the vehicle computer 110 can determine the lateral position L such that the longitudinal axis of the vehicle 105 aligns with a longitudinal axis of the target vehicle 215. As another example, the vehicle computer 110 can determine the lateral position L such that one side of the vehicle 105 aligns with a corresponding side of the target vehicle 215, e.g., to maintain a same distance from the vehicles 105, 215 to the corresponding boundary 230 of the travel path 205.

Figure 3B:
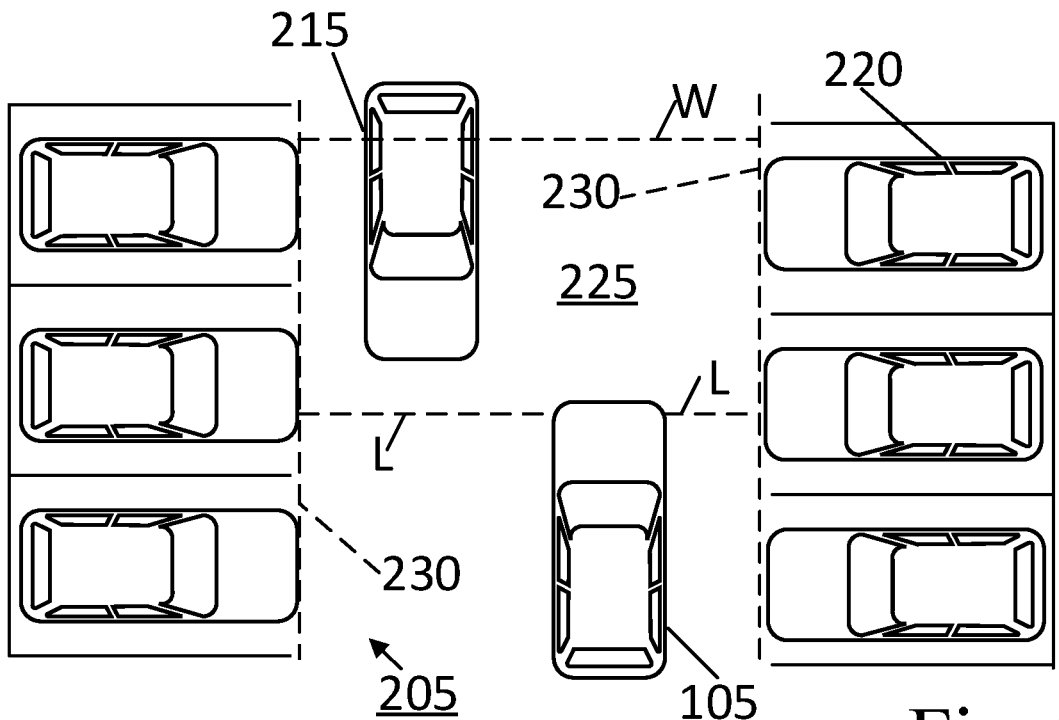

Alternatively, when the travel direction of the target vehicle 215 is towards, i.e., in an opposite direction than, the vehicle 105, the vehicle computer 110 can determine the lateral position L such that the vehicle 105 can operate between the target vehicle 215 and the boundary 230 of the travel path 205. In this situation, the vehicle computer 110 can, for example, determine the lateral position L based on the risk level for the segment 225. The vehicle computer 110 can determine the risk level for the segment 225 from the map. Upon determining that the risk level is at a lowest risk level, e.g., "low" (or 1), the vehicle computer 110 can, for example, determine the lateral position L of the vehicle 105 to be centered between, i.e., equidistant from, the target vehicle 215 and the boundary 230 of the travel path 205, as shown in FIG. 3B.

Figure 3C:
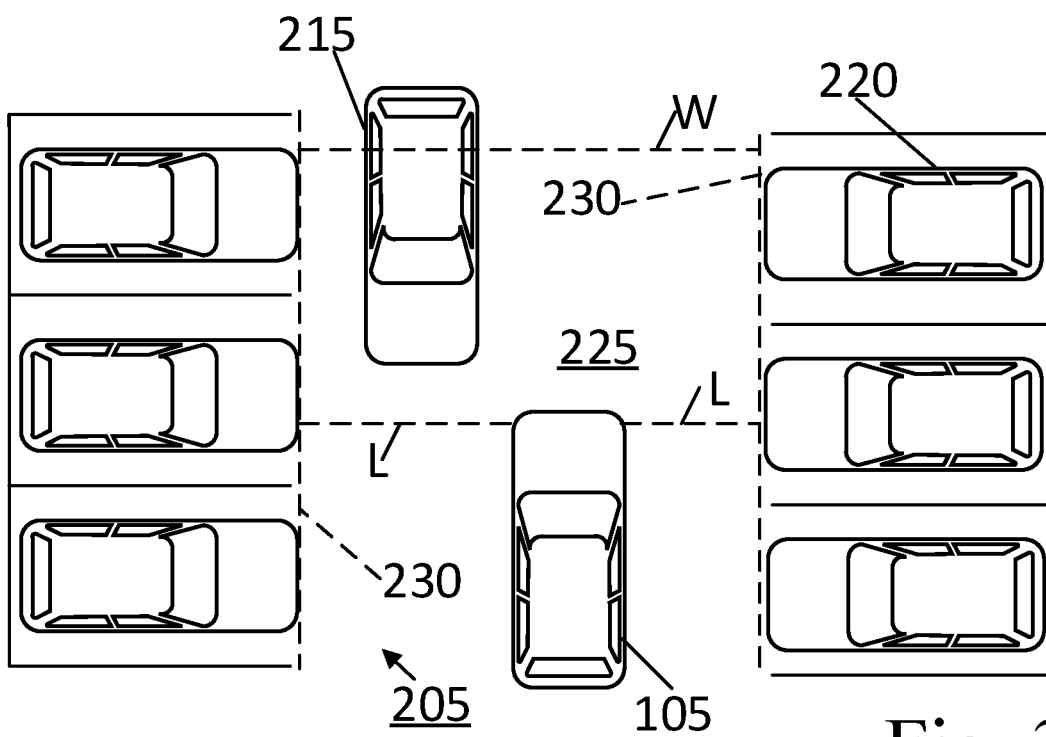
Figure 3D:
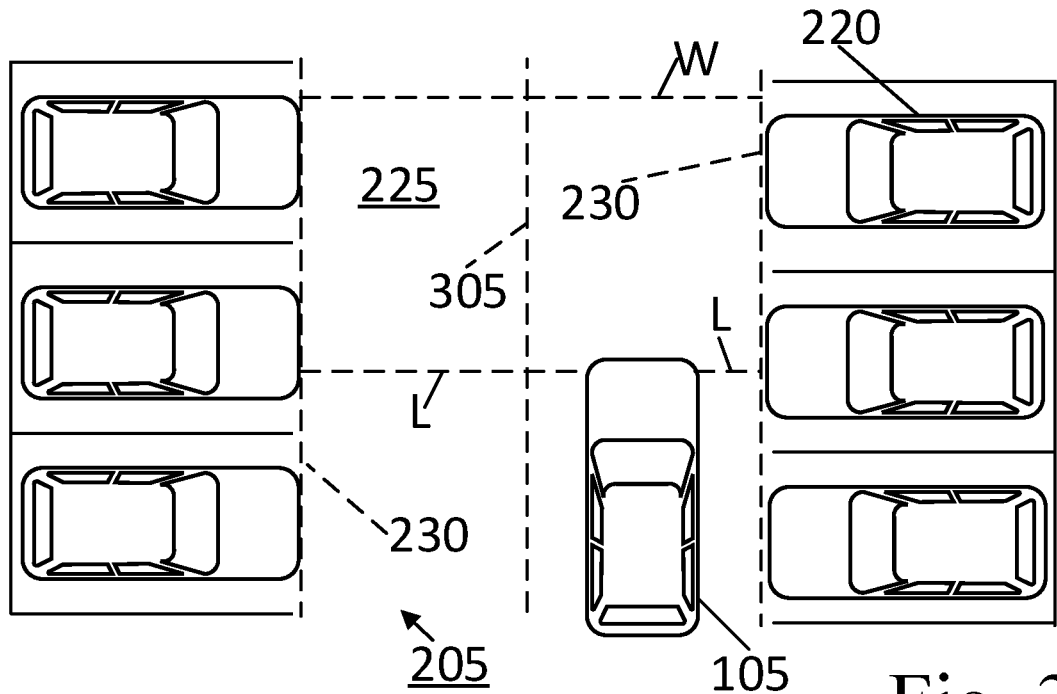
Figure 3E:
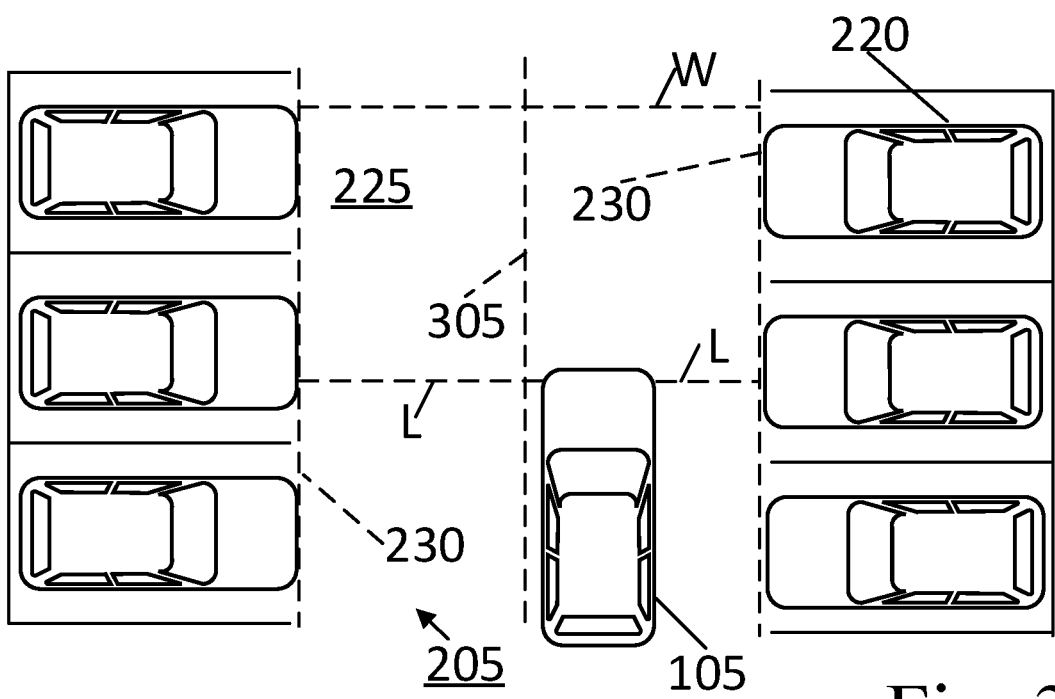

Upon determining that the risk level is not at the lowest level, the vehicle computer 110 can, for example, determine the lateral position L of the vehicle 105 to be closer to the target vehicle 215 than the boundary 230, as shown in FIG. 3C. In such an example, the vehicle computer 110 can determine the lateral position L such that a distance between the vehicle 105 and the target vehicle 215 is greater than or equal to a lateral distance threshold. The lateral distance threshold may be determined empirically, e.g., based on testing that allows for determining a minimum distance between a vehicle and objects at which a vehicle computer can operate the vehicle without impacting the objects. The lateral distance threshold may be stored, e.g., in a memory of the vehicle computer 110. The vehicle computer 110 can determine the distance between the vehicle 105 and the target vehicle 215 based on sensor 115 data, e.g., using free space computation techniques.

The vehicle computer 110 can determine the direction of travel of the target vehicle 215 based on sensor 115 data. For example, the vehicle computer 110 can identify, e.g., using image processing and recognition techniques, a front or a rear of the target vehicle 215 via image data. For example, the vehicle computer 110 can identify headlamps or backup lights, respectively, of the target vehicle 215 in image data. The vehicle computer 110 can determine the direction of travel of the target vehicle 215 based on detecting the front or the rear of the target vehicle 215. When the vehicle computer 110 detects a front of the target vehicle 215, the vehicle computer 110 determines the direction of travel of the target vehicle 215 is opposite the direction of travel of the vehicle 105. When the vehicle computer 110 detects a rear of the target vehicle 215, the vehicle computer 110 determines the direction of travel of the target vehicle 215 is the same as the direction of travel of the vehicle 105.

Additionally, or alternatively, the vehicle computer 110 can determine the lateral position L for the vehicle 105 based on detecting lane markings 305 on the travel path 205. The vehicle computer 110 can detect a presence or absence of lane markings 305 on the travel path 205 based on sensor 115 data, e.g., using image recognition techniques. For example, upon detecting a presence of lane markings 305, the vehicle computer 110 can determine a lateral position L of the vehicle 105 such that the vehicle 105 can operate between the lane markings 305 and the boundary 230. In this situation, the vehicle computer 110 can, for example, determine the lateral position L based on the risk level for the segment 225, e.g., in substantially a same manner as discussed above regarding determining the lateral position L upon detecting a target vehicle 215 approaching the vehicle 105. That is, the vehicle computer 110 can determine the lateral position L of the vehicle 105 to be centered between, i.e., equidistant from, the lane markings 305 and the boundary 230 of the travel path 205 (see FIG. 3D), or closer to the lane markings 305 than the boundary 230 (see FIG. 3E) based on the risk level. If the lateral position L is determined to be closer to the lane markings 305, the vehicle computer 110 can determine the lateral position L such that a distance from the vehicle 105 to the lane markings 305 is at least equal to the lateral distance threshold.

The vehicle computer 110 is programmed to determine a speed for the vehicle 105 based on the determined lateral position L for the vehicle 105 on the travel path 205. The speed is a maximum speed at which the vehicle computer 110 can operate the vehicle 105 and avoid impacting an object 220 that enters the travel path 205, i.e., cross the boundary 230. That is, the vehicle computer 110 can operate the vehicle 105 on the travel path 205 at a speed less than the determined speed. The object 220 may be, e.g., a pedestrian or another vehicle, as shown in the Figures. The vehicle computer 110 can determine the speed, for example, based on Equation 1 below:

$$v < -a_m \left( \frac{D}{v_o} - t_d - t_b \right) \quad (1)$$

where $a_m$ is a maximum deceleration for the vehicle 105, $v_o$ is an object 220 velocity, $t_b$ is a time for a brake component 125 to reach full pressure, $t_d$ is a time for the vehicle computer 110 to detect an object 220 via sensor 115 data, and v is the speed of the vehicle 105. $T_b$ may be determined empirically, e.g., based on testing that allows for determining an amount of time for a vehicle computer to actuate a brake component to full pressure. $T_d$ may be determined empirically, e.g., based on testing that allows for determining an amount of time for a vehicle computer receive and analyze sensor 115 data. $A_m$ may be determined empirically, e.g., based on testing that allows for determining an acceleration of a vehicle when a brake component is at full pressure. $V_o$ may be determined empirically, e.g., based on testing that allows for determining a statistical measure, e.g., an average, a maximum, a median, etc., of speeds of objects 220 entering a travel path 205 within a operating area 200.

Additionally, or alternatively, the vehicle computer 110 can determine the speed based on the risk level for the segment 225 of the travel path 205. That is, the vehicle computer 110 may determine different speeds for different segments 225 of the travel path 205. For example, upon determining that a risk level for a segment 225 is a lowest risk level, e.g., "low (or 1), the vehicle computer 110 can determine that the speed is a maximum speed specified for the operating area 200, e.g., according to the map. As another example, upon determining that a risk level for a segment 225 is a highest risk, e.g., "high" (or 3), the vehicle computer 110 can determine that the speed is a predetermined percentage, e.g., 75%, of the speed calculated via Equation 1.

The vehicle computer 110 is programmed to control the vehicle 105 according to the determined lateral position L and the determined speed on the travel path 205. For example, the vehicle computer 110 can actuate one or more vehicle components 125 to move the vehicle 105 along the travel path 205 at the determined lateral position L and a speed less than or equal to the determined speed.

Based on detecting the presence of the target vehicle 215 travelling in an opposite direction than the vehicle 105, the vehicle computer 110 can compare the determined speed to a speed threshold. The speed threshold can be determined empirically, e.g., based on testing that allows for determining a minimum speed at which the vehicle computer 110 can control the vehicle 105. The speed threshold can be stored, e.g., in a memory of the vehicle computer 110. If the determined speed is less than the speed threshold, then the vehicle computer 110 stops the vehicle 105, e.g., until the target vehicle 215 passes the vehicle 105. If the determined speed is greater than or equal to the speed threshold, then the vehicle computer 110 maintains operation of the vehicle 105 on the travel path 205 according to the determined lateral position L and determined speed.

While operating the vehicle 105 along the travel path 205, the vehicle computer 110 can detect an object 220 entering the travel path 205, i.e., moving across the boundary 230, (see FIG. 3A) based on sensor 115 data. The vehicle computer 110 can determine a distance D from the vehicle 105 to the object 220 based on the sensor 115 data, e.g., using free space computation techniques such as described above. The vehicle computer 110 can then compare the distance D to a longitudinal distance threshold. The longitudinal distance threshold may be determined empirically, e.g., based on testing that allows for determining a maximum distance between a vehicle 105 and an object 220 within which the vehicle computer 110 needs to update vehicle 105 operation to avoid impacting the object 220. The longitudinal distance threshold may be stored, e.g., in a memory of the vehicle computer 110. If the distance D between the object 220 and the vehicle 105 is less than or equal to the longitudinal distance threshold, then the vehicle computer 110 stops the vehicle 105. If the distance D between the object 220 and the vehicle 105 is greater than the longitudinal distance threshold, then the vehicle computer 110 can maintain vehicle 105 operation according to the determined lateral position L and determined speed.

The remote server computer 140 may be programmed to update the map of the operating area 200, e.g., stored in a memory of the remote server computer 140, based on aggregated data. Aggregated data means data from a plurality of vehicle computers 110 that provide messages that is combined arithmetically and/or mathematically, e.g., by averaging and/or using some other statistical measure. That is, the remote server computer 140 may be programmed to receive messages from a plurality of vehicle computers 110 indicating a travel path 205, including one or more segments 225 along with corresponding risk levels and widths W, based on vehicle 105 data of a plurality of vehicles 105. Based on the aggregated data indicating the travel path 205 (e.g., an average number of messages, a percentage of messages, etc., indicating the travel path 205), and taking advantage of the fact that messages from different vehicles 105 are provided independently of one another, the remote server computer 140 can update the map to specify the travel path 205, including the segment(s) 225 along with corresponding risk levels and widths W, based on the vehicle 105 data. The remote server computer 140 can then transmit the map to a plurality of vehicles, including the vehicle 105, e.g., via the network 135.

Figure 4A:
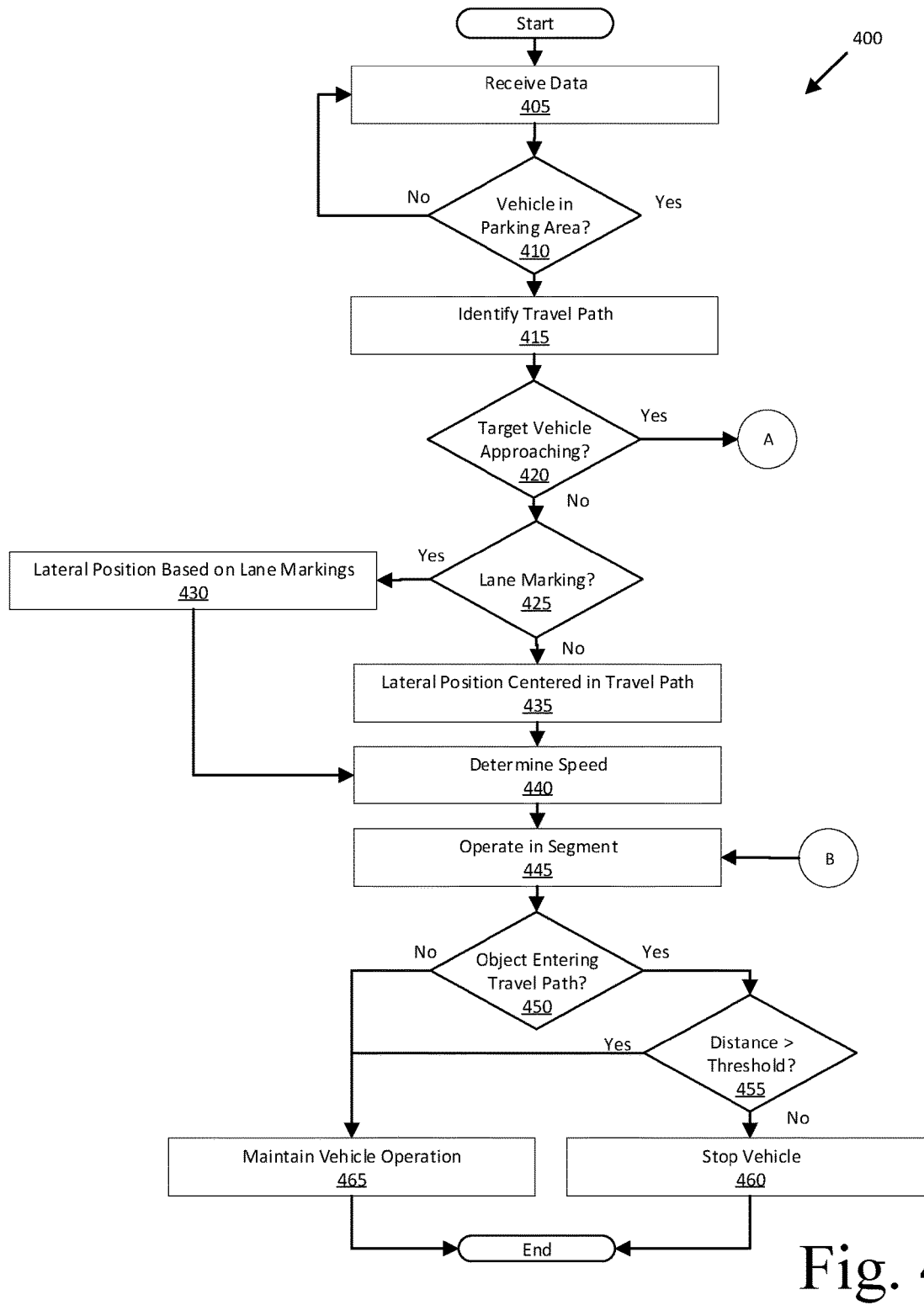
FIG. 4A is a first part of a flowchart of an example process for determining operating parameters for an autonomous mode.

FIG. 4A is a first portion of a flowchart of an example process 400 (the second portion being shown in FIG. 4B because the entire flowchart will not fit on a single drawing sheet) for operating a vehicle 105. The process 400 begins in a block 405. The process 400 can be carried out by a vehicle computer 110 included in the vehicle 105 executing program instructions stored in a memory thereof.

In the block 405, the vehicle computer 110 receives data from one or more sensors 115, e.g., via a vehicle 105 network 135, from a remote server computer 140, e.g., via a network 135, and/or from a computer in another vehicle 105, e.g., via V2V communications. For example, the vehicle computer 110 can receive location data, e.g., geo-coordinates, of the vehicle 105, e.g., from a sensor 115, a navigation system, etc. Additionally, the vehicle computer 110 can receive image data, e.g., from one or more image sensors 115. The image data may include data about the environment around the vehicle 105, e.g., the operating area 200, a sub-area 210, a travel path 205, one or more objects 220, etc. The process 400 continues in a block 410.

In the block 410, the vehicle computer 110 determines whether the vehicle 105 is in a operating area 200 based on map data and/or the received data, e.g., image data and/or location data, as discussed above. If the vehicle computer 110 determines that the vehicle 105 is in the operating area 200, then the process 400 continues in a block 415. If the vehicle computer 110 determines that the vehicle 105 is not in an operating area 200, then the process 400 remains in the block 410.

In the block 415, the vehicle computer 110 identifies a travel path 205 in the operating area 200 based on a map. For example, the vehicle computer 110 can access a map, e.g., stored in a memory of the vehicle computer 110, that specifies the width W of the travel path 205. As discussed above, the vehicle computer 110 can generate the map based on sensor 115 data obtained while operating in a training mode, or the vehicle computer 110 can receive the map from a remote server computer 140. The map specifies the travel path 205, including one or more segments 225 along with corresponding risk levels and widths W for the segment(s) S. The process 400 continues in a block 420.

In the block 420, the vehicle computer 110 determines whether a target vehicle 215 is on the travel path 205. The vehicle computer 110 can detect a presence or absence of a target vehicle 215 based on sensor 115 data, as discussed above. If the vehicle computer 110 detects a target vehicle 215, then the process 400 continues in a block 470. Otherwise, the process 400 continues in a block 425.

In the block 425, the vehicle computer 110 determines whether lane markings 305 are present in the travel path 205. The vehicle computer 110 can identify lane markings 305 based on sensor 115 data, as discussed above. If the vehicle computer 110 detects lane markings 305 on the travel path 205, then the process 400 continues in a block 430. Otherwise, the process 400 continues in a block 435.

In the block 430, the vehicle computer 110 determines that the lateral position L for the vehicle 105 based on the lane markings 305, i.e., is between a boundary 230 of the travel path 205 and the lane markings 305. The lateral position L for the vehicle 105 may be centered between the boundary 230 and the lane markings 305 or closer to the lane markings 305, as discussed above. The process 400 continues in a block 440.

In the block 435, the vehicle computer 110 determines that the lateral position L is centered within the travel path 205. That is, the lateral position L is equidistant from the boundaries 230 of the travel path 205. The process 400 continues in the block 440.

In the block 440, the vehicle computer 110 determines a speed for the vehicle 105 based on the determined lateral position L. For example, the vehicle computer 110 can determine the speed according to Equation 1 above. Additionally, or alternatively, the vehicle computer 110 can determine the speed from a risk level for a segment 225 of the travel path 205, as discussed above. The process 400 continues in a block 445.

In the block 445, the vehicle computer 110 operates the vehicle 105 on the travel path 205 according to the determined lateral position L and determined speed. For example, the vehicle computer 110 can actuate one or more vehicle components 125 to move the vehicle 105 along the travel path 205 at the determined lateral position L and determined speed. The vehicle computer 110 may update vehicle 105 operation based on entering a new segment 225 of the travel path 205 such that the vehicle 105 operation satisfies the determined lateral position L and determined speed for the vehicle 105 in the new segment 225. The process 400 continues in a block 450.

In the block 450, the vehicle computer 110 determines whether an object 220 has entered the travel path 205. The vehicle computer 110 can detect the object 220 entering the travel path 205 based on sensor 115 data, as discussed above. If the vehicle computer 110 detects an object 220 entering the travel path 205, then the process 400 continues in a block 455. Otherwise, the process 400 continues in a block 465.

In the block 455, the vehicle computer 110 determines whether a distance D between the object 220 and the vehicle 105 is greater than a longitudinal distance threshold. The vehicle computer 110 can determine the distance D between the object 220 and the vehicle 105 based on sensor 115 data, as discussed above. The vehicle computer 110 can then compare the distance D to the longitudinal distance threshold. If the distance D is greater than the longitudinal distance threshold, then the process 400 continues in a block 465. Otherwise, the process 400 continues in a block 460.

In the block 460, the vehicle computer 110 stops the vehicle 105. For example, the vehicle computer 110 can actuate one or more vehicle components 125 to stop the vehicle 105. The process 400 may end following the block 460. Alternatively, the process 400 may return to the block 420, e.g., upon detecting that the object 220 has moved and will not impact the vehicle 105.

In the block 465, the vehicle computer 110 maintains vehicle 105 operation according to the determined lateral position L and determined speed for the segment 225 of the travel path 205. The process 400 may end following the block 465. Alternatively, the process 400 may return to the block 420.

Figure 4B:
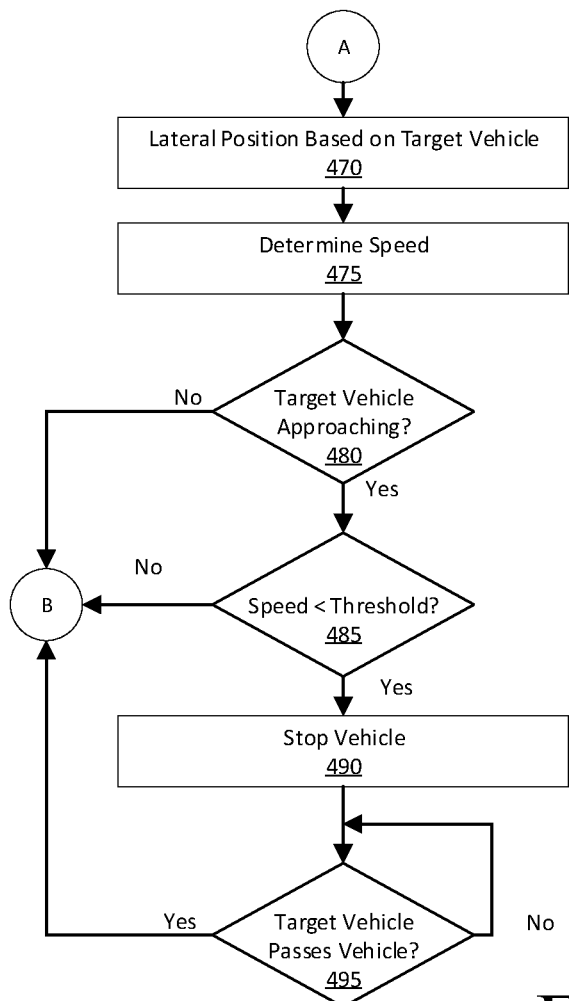
FIG. 4B is a second part of the flowchart of FIG. 4A.

Turning now to FIG. 4B, following the block 435 shown in FIG. 4A, in the block 470, the vehicle computer 110 determines the lateral position L for the vehicle 105 based on the target vehicle 215, as discussed above. The process 400 continues in a block 475.

In the block 475, the vehicle computer 110 determines a speed for the vehicle 105 based on the determined lateral position L for the vehicle 105. The block 475 is substantially the same as the block 440 of process 400 and therefore will not be described further to avoid redundancy. The process 400 continues in a block 475.

In the block 480, the vehicle computer 110 determines whether the target vehicle 215 is approaching the vehicle 105. The vehicle computer 110 can determine a travel direction of the target vehicle 215 based on sensor 115 data, as discussed above. If the target vehicle 215 is approaching the vehicle 105, then the process 400 continues in a block 485. Otherwise, the process 400 continues in the block 445.

In the block 485, the vehicle computer 110 determines whether the determined speed is less than a speed threshold. The vehicle computer 110 can compare the determined speed to the speed threshold. If the determined speed is less than the speed threshold, then the process 400 continues in a block 490. Otherwise, the process 400 continues in the block 445.

In the block 490, the vehicle computer 110 stops the vehicle 105. Specifically, the vehicle computer 110 stops the vehicle 105 at the determined lateral position L, e.g., to allow a target vehicle 215 traveling towards the vehicle 105 sufficient space to operate around the vehicle 105. The process 400 continues in a block 495.

In the block 495, the vehicle computer 110 determines whether the target vehicle 215 has passed the vehicle 105. The vehicle computer 110 can determine that the target vehicle 215 has passed the vehicle 105 based on sensor 115 data indicating an absence of the target vehicle 215 on the travel path 205. If the vehicle computer 110 determines that the target vehicle 215 has passed the vehicle 105, then the process 400 continues in the block 450. Otherwise, the process 400 remains in the block 495.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   while operating a vehicle on a travel path, determine a width of the travel path based on a map;
   upon detecting a presence or an absence of a target vehicle in the travel path, determine a lateral position for the vehicle on the travel path based on the width of the travel path and the presence or absence of the target vehicle; and
   control the vehicle to operate according to the determined lateral position on the travel path and a speed of the vehicle that is based on the determined lateral position on the travel path; wherein the instructions to determine the lateral position for the vehicle on the travel path further include at least one of instructions to:
   (i) determine the lateral position for the vehicle on the travel path additionally based on detecting lane markings on the travel path and, upon detecting the absence of the target vehicle, determine the lateral position to be closer to the lane markings on the travel path than to a boundary of the travel path;
   (ii) upon detecting the absence of the target vehicle, determine the lateral position to be centered on the travel path;
   (iii) upon detecting a presence of the target vehicle, determine the lateral position to be centered between the target vehicle and a boundary of the travel path; or
   (iv) upon detecting a presence of the target vehicle, determine the lateral position to be closer to the target vehicle than to a boundary of the travel path.

2. The system of claim 1, wherein the instructions further include instructions to, upon determining a risk level for the travel path from the map, determine the speed for the vehicle on the travel path additionally based on the risk level of the travel path.

3. The system of claim 2, further comprising a remote computer including a second processor and a second memory, the second memory storing instructions executable by the second processor to generate the map based on aggregated data including messages from a plurality of vehicles indicating the risk level of the travel path.

4. The system of claim 1, wherein the instructions further include instructions to:
   determine a risk level for the travel path based on a type of object detected alongside the travel path; and
   determine the speed for the vehicle within the travel path additionally based on the risk level of the travel path.

5. The system of claim 4, wherein the instructions further include instructions to determine the risk level for the travel path additionally based on detecting a blind zone alongside the travel path.

6. The system of claim 1, wherein the instructions further include instructions to, upon detecting a presence of the target vehicle, stop the vehicle based on the determined speed being less than a speed threshold.

7. The system of claim 1, wherein the instructions further include instructions to, upon detecting an object entering the travel path, stop the vehicle based on the object being within a distance threshold of the vehicle.

8. The system of claim 1, wherein the instructions further include instructions to generate the map based on sensor data obtained while operating the vehicle in a training mode.

9. The system of claim 1, wherein the instructions further include instructions to provide the map to a remote computer.

10. The system of claim 1, wherein the target vehicle is traveling in an opposite direction than the vehicle.

11. A method, comprising:
    while operating a vehicle on a travel path, determining a width of the travel path based on a map;
    upon detecting a presence or an absence of a target vehicle in the travel path, determining a lateral position for the vehicle on the travel path based on the width of the travel path and the presence or absence of the target vehicle; and
    controlling the vehicle to operate according to the determined lateral position on the travel path and a speed of the vehicle that is based on the determined lateral position on the travel path; wherein determining the lateral position for the vehicle on the travel path includes at least one of:
    (i) determining the lateral position for the vehicle on the travel path additionally based on detecting lane markings on the travel path and, upon detecting the absence of the target vehicle, determining the lateral position to be closer to the lane markings on the travel path than to a boundary of the travel path;
    (ii) upon detecting the absence of the target vehicle, determining the lateral position to be centered on the travel path;
    (iii) upon detecting a presence of the target vehicle, determining the lateral position to be centered between the target vehicle and a boundary of the travel path; or
    (iv) upon detecting a presence of the target vehicle, determining the lateral position to be closer to the target vehicle than to a boundary of the travel path.

12. The method of claim 11, further comprising, upon determining a risk level for the travel path from the map, determining the speed for the vehicle on the travel path additionally based on the risk level of the travel path.

13. The method of claim 12, wherein the map is generated based on aggregated data including messages from a plurality of vehicles indicating the risk level of the travel path.

14. The method of claim 11, further comprising:
    determining a risk level for the travel path based on a type of object detected alongside the travel path; and
    determining the speed for the vehicle within the travel path additionally based on the risk level of the travel path.

15. The method of claim 14, further comprising determining the risk level for the travel path additionally based on detecting a blind zone alongside the travel path.

16. The method of claim 11, wherein the instructions further include instructions to, upon detecting a presence of the target vehicle, stop the vehicle based on the determined speed being less than a speed threshold.

17. The method of claim 11, further comprising, upon detecting an object entering the travel path, stopping the vehicle based on the object being within a distance threshold of the vehicle.

18. The method of claim 11, further comprising generating the map based on sensor data obtained while operating the vehicle in a training mode.

19. The method of claim 11, further comprising providing the map to a remote computer.

20. The method of claim 11, wherein the target vehicle is traveling in an opposite direction than the vehicle.

* * * * *